United States Patent
Stemmle et al.

(10) Patent No.: US 9,159,473 B2
(45) Date of Patent: Oct. 13, 2015

(54) METHOD OF ELECTRICALLY CONDUCTIVELY CONNECTING TWO SUPERCONDUCTIVE CABLES

(71) Applicant: NEXANS, Paris (FR)

(72) Inventors: Mark Stemmle, Hannover (DE); Frank Schmidt, Langenhagen (DE)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/311,832

(22) Filed: Jun. 23, 2014

(65) Prior Publication Data

US 2014/0378311 A1  Dec. 25, 2014

(30) Foreign Application Priority Data

Jun. 25, 2013 (EP) .................................. 13305871

(51) Int. Cl.
*H01B 12/00* (2006.01)
*H01B 12/02* (2006.01)
*H01R 4/68* (2006.01)
*H02G 15/34* (2006.01)
*H01B 12/16* (2006.01)

(52) U.S. Cl.
CPC ................ *H01B 12/02* (2013.01); *H01B 12/16* (2013.01); *H01R 4/68* (2013.01); *H02G 15/34* (2013.01); *Y10T 29/49014* (2015.01)

(58) Field of Classification Search
CPC ............... H01B 12/06; H01B 13/0036; H01L 39/2461; H01L 39/12; H01L 39/24
See application file for complete search history.

(56) References Cited

U.S. PATENT DOCUMENTS

| 7,568,946 B1 * | 8/2009 | Goeke ......................... 439/580 |
| 8,886,267 B2 * | 11/2014 | Folts et al. .................. 505/230 |
| 2005/0173149 A1 | 8/2005 | Gouge et al. |

* cited by examiner

*Primary Examiner* — Colleen Dunn
(74) *Attorney, Agent, or Firm* — Sofer & Haroun, LLP

(57) ABSTRACT

A method of electrically conductively connecting two superconductive cables includes freeing the conductors and screens of surrounding layers at the ends of the two cables. Subsequently, the ends of the two cables (1, 2) are placed next o each other and parallel to one another in such a way that their free ends point, in the same direction, and the ends are rigidly connected to one another in this position. The conductors and their screens are electrically conductively connected to each other through electrical contact elements (8, 9) extending transversely of the axial direction. and the two cable ends treated in this manner are arranged in a housing (10) of a cryostat when building up the transmission length which, during operation of the transmission length, a flowable cooling agent with insulating properties flows through the housing.

7 Claims, 2 Drawing Sheets

METHOD OF ELECTRICALLY CONDUCTIVELY CONNECTING TWO SUPERCONDUCTIVE CABLES

RELATED APPLICATION

This application claims the benefit of priority from European Patent Application No. 1.3 305 871.9, filed on Jun. 25, 2013, the entirety of which is incorporated by reference.

BACKGROUND

1. Field of the Invention

The invention relates to a method of electrically conductively connecting two superconductive cables which each have at least one superconductive cable surrounded by a dielectric and at least one electrically effective screen arranged above the dielectric, wherein the conductors and screens are at the end of the two cables initially freed of the surrounding layers and are subsequently electrically conductively connected to each other.

2. Description of Related Art

Superconductive cables have been known for a long time in various embodiments. This is basically also true for technology for electrically connecting two superconductive cables. A significant difference of the superconductive cables as compared to conventional cables resides in the fact that the superconductive cables include electrical conductors of a material which, at sufficiently low temperatures, changes over into the superconductive state, with an electrical direct current resistance which is around zero. Suitable superconductive materials are, for example, oxidic materials on the basis of rare earths. Sufficiently low temperatures for changing the material over into the superconductive state are, for example, between 67K and 110K. Suitable cooling agents for all these materials are, for example, nitrogen, helium, neon, and hydrogen or mixtures of these substances. When operating a transmission length for electrical energy with at least one superconductive cable, the superconductive cable is arranged in accordance with known technology in a cryostat which consists of at least one thermally insulated pipe through which a cooling agent suitable for the superconductive material being used is conducted when operating the transmission length, wherein the cooling agent is advantageously one of the cooling agents mentioned above.

In transmission lengths of electrical energy, two or more lengths of a superconductive cable must be connected electrically conductively with one another. This means that the conductors and the screens of the two cables must initially be freed of surrounding layers. After electrically conductively connecting the conductors, the removed layers are in accordance with conventional technology once again applied. This is particularly true for an insulation (dielectric) surrounding the superconductive conductor which is reconstructed, for example, by winding bands of insulation material onto the entire connecting point, including the two conductors. Subsequently, the screens are also electrically conductively connected and if necessary, any layers located above the conductors are restored. This is already very complicated and time consuming in a cable having only one conductor and one screen. In addition, it requires the use of expert personnel. In a cable with two or three concentrically arranged conductors which are insulated relative to each other, as it is disclosed for example in EP 1 552 536 B1, the expenditures are extremely high, especially since it must be insured in this connection that the wall thickness of restored insulation or insulations is at least not significantly greater than the original wall thickness. It is only then that the dimensions of a cryostat surrounding the connecting point can be kept so small that the operation of the transmission length, particularly the flow of the cooling agent, is not impaired by the cryostat.

OBJECTS AND SUMMARY

The invention is based on the object of configuring the above mentioned method in such a way that two superconductive cables can be connected electrically conductively to each other with a substantially reduced expenditure.

In accordance with the invention, the object is met in that the ends of the two cables are arranged next to each other and parallel to each other in such a way that their free ends point in the same direction, the ends of the two cables are fixedly connected to each other, the conductors of the two cables, on the one hand, and the screens on the other hand, are electrically conductively connected to each other transversely through. electric contact elements extending transversely of their axial direction, and the two cable ends treated in this manner are arranged when building up a transmission length for electrical energy jointly in a housing for a cryostat, wherein during operation of the transmission length, a flowable cooling agent with insulating properties flows through the housing.

The significant advantage of this method resides in the fact that after electrically conductively connecting the superconductive conductors—independently of their number—and the screens, no insulating layers have to be applied to the connecting points of the respective conductors. The expenses for connecting the two cables are significantly reduced as a result. This is true for the saving of insulation material as well as for the time consuming activity of a workman.

This advantage is particularly apparent when the cables to be connected have two or three coaxially arranged conductors. In accordance with previous technology, after electrically conductively connecting two conductors, it was necessary to initially restore the insulating layer or the dielectric for these conductors, before the next conductors could be connected through.

It is also important for the method and the corresponding arrangement that the ends of the two cables, which extend parallel to each other, are mechanically connected to each other so that the electrical contact elements, extending transversely of the axial direction, can be mounted in a simple manner on the respective conductors and screens, and cannot be damaged when the cable ends are moved.

For the method and a finished arrangement manufactured by the method, it is of no significance in what sequence the individual measures are carried out. Preferred is a method in which initially the conductors or the screens of the two cable ends are exposed. Subsequently, at least the end of one cable is bent in such a way that it is positioned parallel to the end of the other cable and can be connected mechanically to the same. The contact elements are then mounted, wherein the contact elements can be pushed from the free ends of the cable in axial direction toward the conductors and the screens. All the above described method steps can essentially also be carried out outside of a cryostat.

However, it is a particular advantage if the two cables are arranged already in a cryostat, and, after exposing the conductors and the screens, the two cables are inserted into a housing constructed as a cryostat. In so doing, the conductors and the screens can initially be mechanically connected to each other in the housing before the contact elements are mounted.

A cryostat together with a superconductive cable bent backwards by 180° provides the possibility of mounting compensation elements symmetrically relative to each other in the cryostat, whereby length changes of the cryostat during cooling of the cable and when reheating the cable can be compensated.

BRIEF DESCRIPTION OF THE DRAWINGS:

The method according to the invention and the arrangement manufactured with the same are explained as embodiments with the aid of the drawings.

In the drawings.

DETAILED DESCRIPTION

Figure 1:
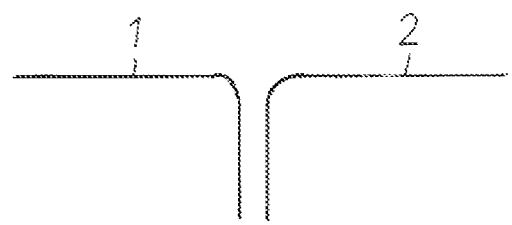
FIGS. 1 to 3 show purely schematically the shape of the ends of two superconductive cables in three different embodiments.
Figure 2:
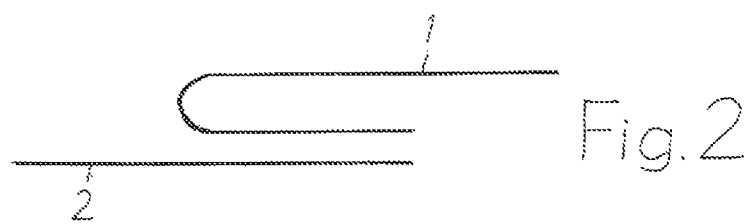
Figure 3:
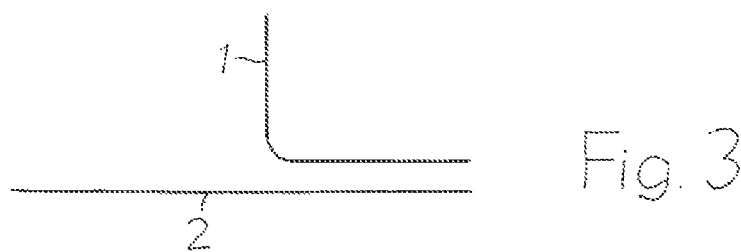

In accordance with the invention, the ends of two superconductive cables are to be arranged next to and parallel to each other after exposing their conductors and screens. For that purpose, at least the end of one of the two cables must be bent in such a way that it can be positioned parallel to the end of the other cable. Three examples for a corresponding configuration of the ends of the two cables are illustrated in FIGS. 1 to 3. In this connection, both cables are only illustrated by lines.

In accordance with FIG. 1, the ends of two superconductive cables 1 and 2 are each bent by 90°. They are located parallel to one another and point in the same direction with their free ends.

In accordance with FIG. 2, the end of the cable 1 is bent back by 180°, while the end of the cable 2 is straight.

In accordance with FIG. 3, the end of the cable 1 is bent by 90°, while the end of the cable 2 is straight. In that case, the cable path is bent at a right angle starting at the connecting point of the two cables 1 and 2.

In the following description, the embodiment of FIG. 2 will be explained in more detail with the aid of FIG. 4 in which the ends of two superconductive cables 1 and 2, which extend parallel to each other and are mechanically connected to each other, are illustrated. This is indicated by a cross-hatched intermediate piece 3 between the two cables.

Figure 5:
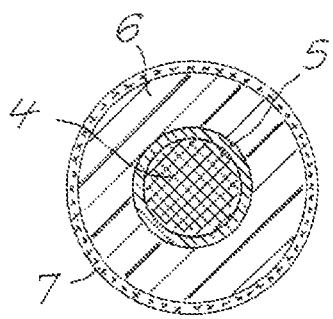
FIG. 5 shows a sectional view through a superconductive cable.

In accordance with the embodiment illustrated in FIG. 5, each of the two cables 1 and 2 has a superconductive conductor 5 which is arranged on the carrier 4 which, in this technical field, is also called "former." The conductor 5 is surrounded by a dielectric 6 (insulation) above which is arranged an electrically effective screen 7. The conductor 5 of the two cables 1 and 2, as well as their screen 7, are at the ends of the cables freed of the layers surrounding them, i.e. also from the dielectric 6. The ends of the two cables 1 and 2 point in the same direction. They are essentially positioned "congruent" next to each other. Accordingly, for this purpose, the cable 1 is bent in its end area by 180°. Accordingly, it is bent backward with its end facing opposite to its path in a transmission length. In the illustration of FIG. 4, the outer layer of each cable 1 and 2 forms the screen 7.

The conductors 5 of the two cables 1 and 2 are electrically conductively connected to each other through a contact element 8 which extends transversely of the axial direction of the two cables 1 and 2. In the same manner, the screen 7 of each cable is electrically conductively connected to each other through an electrical contact element 9. The contact elements 8 and 9 can advantageously be pushed from the free ends of the cable onto the conductors 5 and the screens 7.

Figure 4:
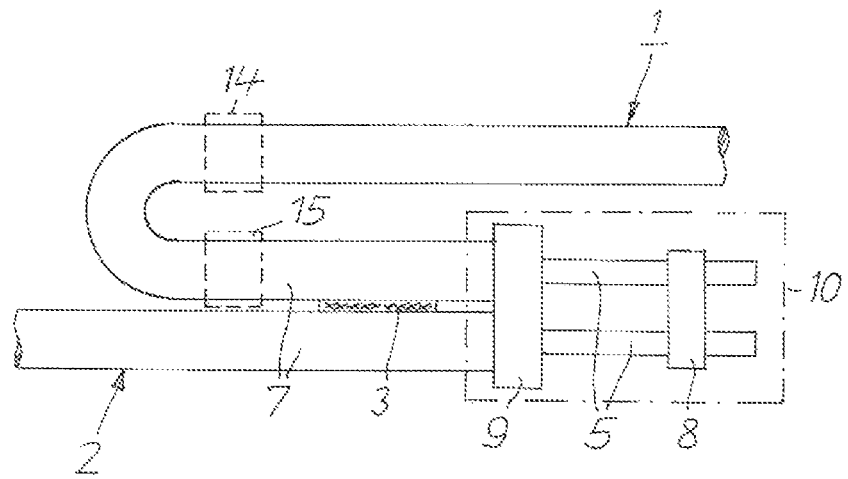
FIG. 4 shows in a schematic illustration a connecting point between two superconductive cables in a more detailed illustration.

The cable ends connected in this manner mechanically and electrically to each other can be inserted into a housing 10, indicated by dash dot lines in FIG. 4, constructed as a cryostat for forming a transmission length for electrical energy, for example, by pushing. When operating the transmission length, the cooling agent used, for example, liquid nitrogen, also flows through the housing 10. The cooling agent is simultaneously an insulating medium for the two cables 1 and 2 or their conductors 5 and 7, so that as already mentioned, the mounting of insulating material can be omitted.

Figure 6:
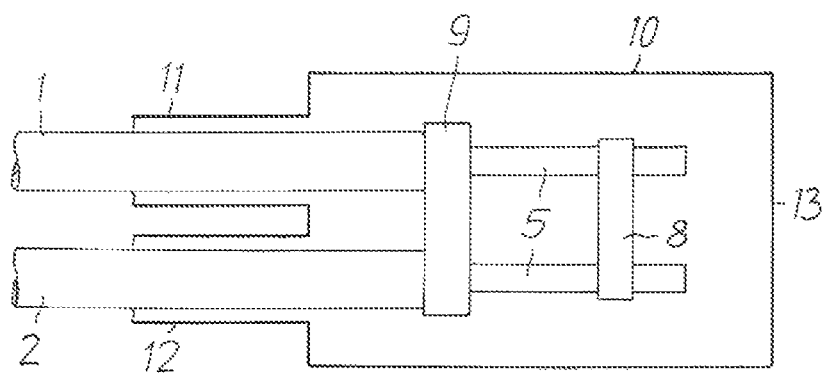
FIG. 6 shows, also in a schematic illustration, the connecting point according to FIG. 4 arranged in a cryostat.

In accordance with a preferred embodiment, the cables 1 and 2 are each at first arranged in a cryostat from which they each protrude by such a length that their conductors and screens can be exposed as disclosed above. The ends of corresponding cryostats 11 and 12 are shown in FIG. 6. They are connected to the housing 10 which is constructed as a cryostat in this embodiment. When guiding the ends of the two cables 1 and 2 into the housing 10, they can be connected mechanically to each other through holding elements which are located in the housing.

The electrical contact elements 8 and 9 can then be placed within the housing 10 onto the conductors 5 and screens 7, particularly by pushing, wherein for this purpose, the correspondingly configured housing 10 is initially still open, for example, at the end face 13. The end face 13 of the housing 10 is finally closed.

The curved end of the cable 1, and thus, of the cryostat 11 surrounding the cable 1, provide the possibility of mounting compensating elements indicated in the drawing by two frames 14 and 15 shown in broken lines, symmetrically relative to each other in the cryostat 11, which are suitable for compensating length changes of the cryostat 11 which may occur during cooling and reheating of the cable 1. The suitable compensating elements are, for example, bellows.

The invention claimed is:

1. Method of electrically conductively connecting two superconductive cables which each have at least one superconductive conductor surrounded by a dielectric, and an electrically effective screen arranged above the dielectric, where the conductors and screens to be connected to each other are at first freed at the ends of both cables of surrounding layers and are subsequently electrically conductively connected to each other, said method comprising the steps of:

the ends of the two cables are arranged next to each other and parallel to one another in such a way that their free ends point in the same direction;

conductors of the two cables, on the one hand, and their screens on the other hand, are electrically conductively connected to each other through electrical contact elements which extend transversely of their axis of direction; and the two cable ends treated in this manner are arranged, when building up a transmission length for electrical energy, jointly in a housing of a cryostat, in which, when operating the transmission length a flowable cooling agent with insulating properties flows through the cryostat.

2. Method according to claim 1, wherein at least the end of one of the two cables is bent in such a way that it extends parallel to the end of the other cable.

3. Method according to claim 2, wherein the end of the one cable is bent by 90°.

4. according to claim 2, wherein the end of the one cable is bent back by 180°.

5. Method according to claim 1, wherein the ends of the two cables are bent by 90° each.

6. Method according to claim 1, wherein each of the two cables is first mounted in a cryostat connected to the housing in such a way that the respective cable end protrudes out of the corresponding cryostat and into the housing, the two cable ends are mechanically connected to each other in the still open housing;

the contact elements are mounted within the housing (10) on in the exposed conductors and screens; and the housing is finally closed.

7. Arrangement manufactured with the method according to claim 6, wherein in a housing constructed as a cryostat, the ends of two superconductive cables are freed of surrounding layers; and the conductors of the two cables on the one hand, as well as their screens on the other hand, are electrically conductively connected to each other through electrical contact elements, extending transversely of their axial direction.

\* \* \* \* \*